(12) United States Patent
Marvie et al.

(10) Patent No.: US 9,082,221 B2
(45) Date of Patent: Jul. 14, 2015

(54) METHOD FOR THE REAL-TIME COMPOSITION OF A VIDEO

(75) Inventors: Jean-Eudes Marvie, Cesson Sevigne (FR); Gerard Briand, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 719 days.

(21) Appl. No.: 12/737,253

(22) PCT Filed: Jun. 29, 2009

(86) PCT No.: PCT/EP2009/058121
§ 371 (c)(1),
(2), (4) Date: Dec. 22, 2010

(87) PCT Pub. No.: WO2010/003844
PCT Pub. Date: Jan. 14, 2010

(65) Prior Publication Data
US 2011/0090307 A1    Apr. 21, 2011

(30) Foreign Application Priority Data
Jun. 30, 2008 (FR) .................................. 08 54378

(51) Int. Cl.
*H04N 13/00* (2006.01)
*H04N 13/04* (2006.01)
(Continued)

(52) U.S. Cl.
CPC ............ *G06T 15/20* (2013.01); *H04N 13/0003* (2013.01); *H04N 13/004* (2013.01);
(Continued)

(58) Field of Classification Search
CPC .......... H04N 13/0003; H04N 13/0007; H04N 13/0011; H04N 13/004; H04N 13/0059; H04N 13/0062; H04N 13/0205; H04N 13/025; H04N 13/0271; G06T 15/20
USPC .................................... 348/42, 43, 46, 51, 60
See application file for complete search history.

(56) References Cited

U.S. PATENT DOCUMENTS

| | | |
|---|---|---|
| 5,280,337 A | 1/1994 | DesJardins |
| 5,493,637 A | 2/1996 | Martin |

(Continued)

FOREIGN PATENT DOCUMENTS

| | | |
|---|---|---|
| CA | 2298337 | 8/2001 |
| EP | 0586140 | 3/1994 |

(Continued)

OTHER PUBLICATIONS

Oda et al., "A Video-Rate Stereo Machine and It's Application Virtual Reality", 27th International Symposium on Industrial Robots, Oct. 1, 1996, pp. 671-676.

(Continued)

*Primary Examiner* — Geepy Pe
(74) *Attorney, Agent, or Firm* — Tutunjian & Bitetto, P.C.

(57) ABSTRACT

A method for real time construction of a video sequence comprising a modelled 3D object is provided. The method comprises pre-calculating data representative of a first image of a three-dimensional environment and a first associated depth information. A live calculating of data representative of a second image representing the modelled object on which is mapped a current image of a live video stream, and a second depth information associated with the second image is performed. The sequence is composed by combining the first image and the second image according to the first and second depth information.

10 Claims, 4 Drawing Sheets

Figure 1:
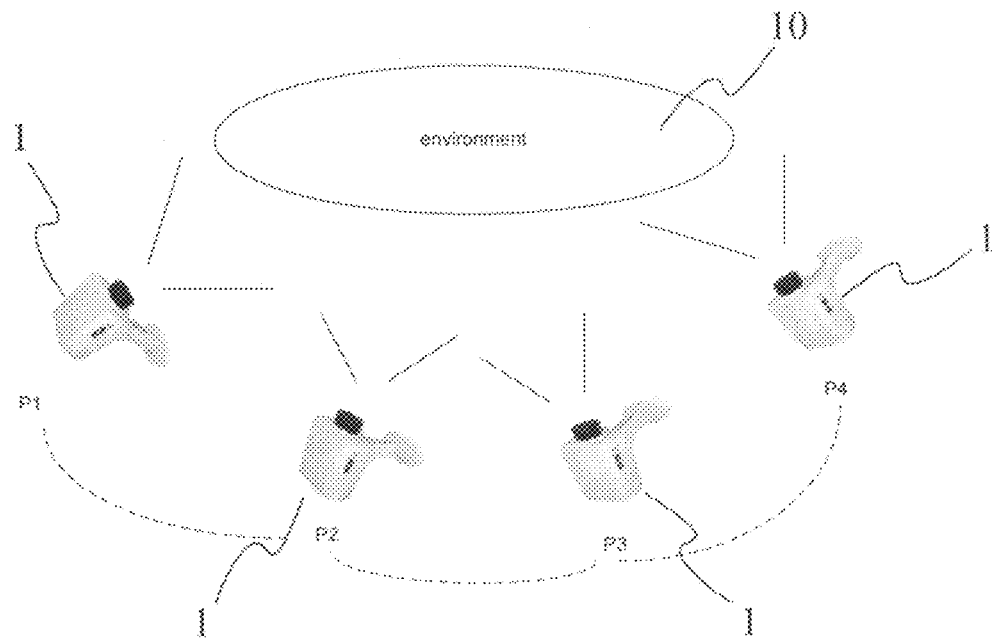

(51) Int. Cl.
  *G06T 15/20* (2011.01)
  *H04N 13/02* (2006.01)
(52) U.S. Cl.
  CPC ....... *H04N13/0007* (2013.01); *H04N 13/0011* (2013.01); *H04N 13/0059* (2013.01); *H04N 13/0062* (2013.01); *H04N 13/025* (2013.01); *H04N 13/0271* (2013.01)

(56) References Cited

U.S. PATENT DOCUMENTS

| | | | |
|---|---|---|---|
| 5,844,569 | A | 12/1998 | Eisler et al. |
| 6,151,009 | A | 11/2000 | Kanade et al. |
| 6,215,503 | B1 * | 4/2001 | Snyder et al. ............ 345/629 |
| 6,466,208 | B1 | 10/2002 | Yet et al. |
| 6,492,987 | B1 | 12/2002 | Morein |
| 6,618,048 | B1 | 9/2003 | Leather |
| 6,940,538 | B2 * | 9/2005 | Rafey et al. ............ 348/157 |
| 2003/0038892 | A1 | 2/2003 | Wang et al. |
| 2003/0189568 | A1 | 10/2003 | Alkouh |
| 2003/0202120 | A1 | 10/2003 | Mack |
| 2004/0001645 | A1 | 1/2004 | Snyder |
| 2004/0222988 | A1 | 11/2004 | Donnelly |
| 2005/0140684 | A1 | 6/2005 | Buehler |
| 2005/0162435 | A1 | 7/2005 | Hashimoto et al. |
| 2005/0195187 | A1 | 9/2005 | Seiler et al. |
| 2006/0058100 | A1 | 3/2006 | Pacey et al. |
| 2007/0008316 | A1 | 1/2007 | Mido et al. |

FOREIGN PATENT DOCUMENTS

| | | |
|---|---|---|
| EP | 0594456 | 4/1994 |
| EP | 0817126 | 1/1998 |
| EP | 1103920 | 5/2001 |
| EP | 1235187 | 2/2002 |
| WO | WO9636011 | 11/1996 |
| WO | WO0139129 | 5/2001 |

OTHER PUBLICATIONS

Kanade et al., "Video-Rate Z Keying: A New Method for Merging Images", Internet Citation [Online], Dec. 1, 1995, pp. 1-8.
Blonde et al., "A Virtual Studio for Live Broadcasting: The Mona Lisa Project", IEEE Multimedia, vol. 3, No. 2, New York, NY, pp. 18-28.
Kim et al., "Photo-Realistic Interactive Virtual Environment Generation Usng Multiview Cameras", Proceedings of the SPIE, vol. 4310, Jan. 24, 2001, pp. 245-254.
Kanade et al., "A Stereo Machine for Video-Rate Dense Depth Mapping and Its New Applications", Proceedings of the 1996 IEEE Computer Society Conference on Computer Vision and Pattern Recognition, San Francisco, CA, Jun. 18-20, 1996, pp. 196-202.
Gibbs et al., "Virtual Studios: An Overview", IEEE Multimedia, vol. 5, No. 1, New York, NY, pp. 18-35.
Search Report Dated Oct. 15, 2009.
Berekovic et al-A flexible processor architecture for MPEG-4 image compositing-Proceedings of the 1998 IEEE International Conference on Acoustics, Speech and Signal Processing, ICASSP '98, Pt. vol. 5, pp. 3153-3156 vol. 5, Published: New York, NY, USA, 1998, 6 vol. Ixiii+3816 pp-Conference Data: Proceedings of the 1998 IEEE International Conference on Acoustics, Speech and Signal Processing, ICASSP '98, Seattle, WA, USA, May 12-15, 1998, Sponsored by: IEEE Signal Process. Soc.
Chen et al-Real-time depth image based rendering hardware accelerator for advanced three dimensional television system-Organization Source : DSP/IC Design Lab.; Nat. Taiwan Univ.; Taipei; Taiwan-Source: 2006 IEEE International Conference on Multimedia and Expo (IEEE Cat. No. 06TH8883C), pp. 4 pp., Published: Piscataway, NJ, USA, 2006, CD-ROM pp-2006 IEEE International Conference on Multimedia and Expo (IEEE Cat. No. 06TH8883C), Toronto, Ont., Canada, Jul. 9-12, 2006.
Delannoy-The reality of virtual environments-Organization Source: Ottawa Univ.; Ont.; Canada-Source: IEEE Potentials, vol. 24, No. 3, pp. 37-39, Aug.-Sep. 2005.
Geys et al-Hierarchical coarse to fine depth estimation for realistic view interpolation-Proceedings. Fifth International Conference on 3-D Digital Imaging and Modeling, pp. 237-244, Published: Los Alamitos, CA, USA, 2005, xiv+598 pp.
Hansard et al-Image-based rendering via the standard graphics pipeline-2000 IEEE International Conference on Multimedia and Expo. ICME2000. Proceedings. Latest Advances in the Fast Changing World of Multimedia, Pt. vol. 3, pp. 1437-1440 vol. 3, Published: Piscataway, NJ, USA, 2000, 3 vol. xxxv+17778 pp-Conference Data: 2000 IEEE International Conference on Multimedia and Expo. ICME2000. Proceedings. Latest Advances in the Fast Changing World of Multimedia, New York, NY, USA, Jul. 30-Aug. 2, 2000.
Kim et al-Depth video enhancement for haptic interaction using a smooth surface reconstruction-IEICE Transactions on Information and Systems, vol.E89-D, No. 1, pp. 37-44, Jan. 2006.

* cited by examiner

METHOD FOR THE REAL-TIME COMPOSITION OF A VIDEO

This application claims the benefit, under 35 U.S.C. §365 of International Application PCT/EP2009/058121, filed Jun. 29, 2009, which was published in accordance with PCT Article 21(2) on Jan. 14, 2010 in French and which claims the benefit of French patent application No. 0854378 filed Jun. 30, 2008

1. SCOPE OF THE INVENTION

The invention relates to the domain of the live construction of a video sequence comprising notably three dimensional objects supporting live video streams. The invention is understood in the context of special effects for a live composition.

2. PRIOR ART

According to the prior art, there are various methods to perform video composition. One known method consists in encrusting a live stream onto a pre-calculated video from 2D (for two dimensions) and 3D (for three dimensions) content. Carrying out the pre-rendering of a video by pre-calculation advantageously enables several videos to be recorded to manage several viewpoints and enables display of very complex and high quality effects in terms of the rendering, a quality that can not by attained by a live rendering. The combining of two video streams, that is to say of a live stream with a pre-calculated video stream, is carried out using a transparency key, which amounts to superimposing two layers, one on top of the other: it involves a 2D combination with a notion of layers. However, such a method does not enable the mapping of a live stream on a 3D geometry or management of occlusion.

3. SUMMARY OF THE INVENTION

The purpose of the invention is to overcome at least one of these disadvantages of the prior art.

More specifically, the purpose of the invention is the composition in three dimensions of good quality, of a video sequence integrating a live video stream.

The invention relates to a method of live construction of a video sequence comprising an object modelled in three dimensions. The method comprises the steps for:
 pre-calculating data representative of at least one first image of a three-dimensional environment and a first item of depth information associated with the image,
 live calculation of:
  data representative of at least one second image representing the modelled object on which is mapped a current image of a live video stream, the current image forming the texture of the modelled object, and
  a second item of depth information associated with the at least one second image, and
 composing live the sequence by combining the at least one first image and at least one second image according to first and second items of depth information.

According to a particular characteristic, the method comprises the steps of:
 initializing a destination buffer of said at least one second image with the data representative of said at least one first image, and
 initializing a destination buffer of said second item of depth information with said first item of depth information.

Advantageously, at least one occlusion test is carried out for each pixel of the sequence during the composition.

According to a specific characteristic, the environment is a video pre-calculated with fixed camera.

According to another characteristic, the environment is a video pre-calculated with a mobile camera.

4. LIST OF FIGURES

Figure 2:
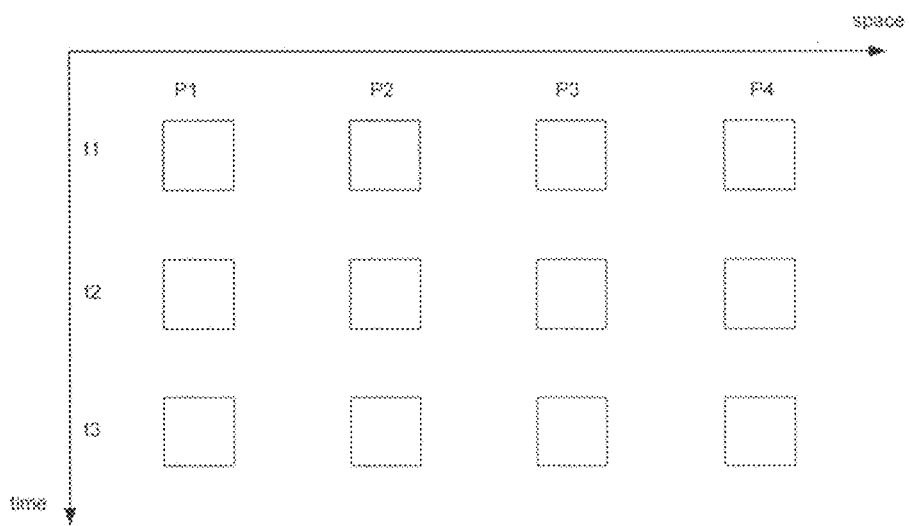
Figure 3:
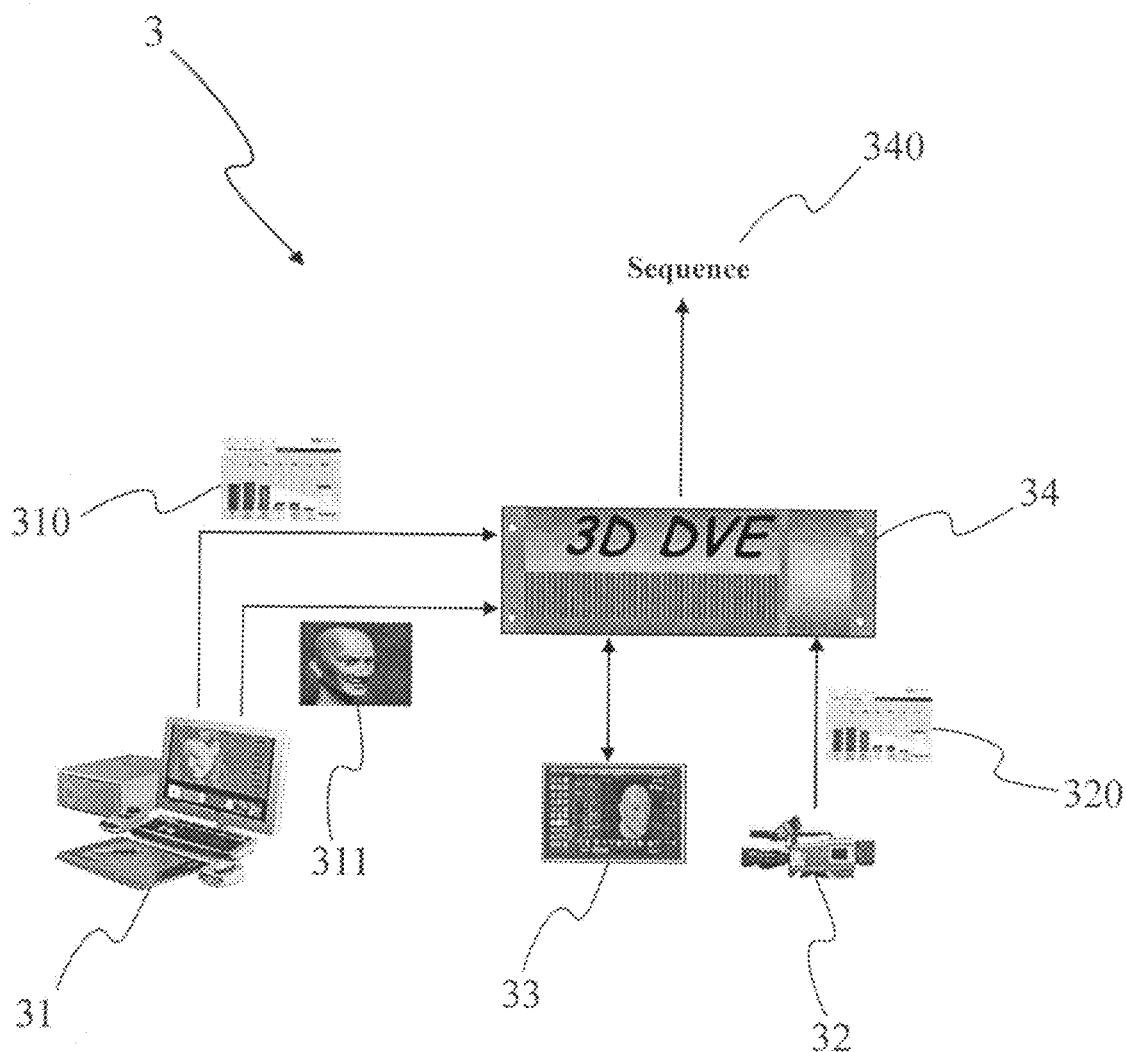
Figure 4:
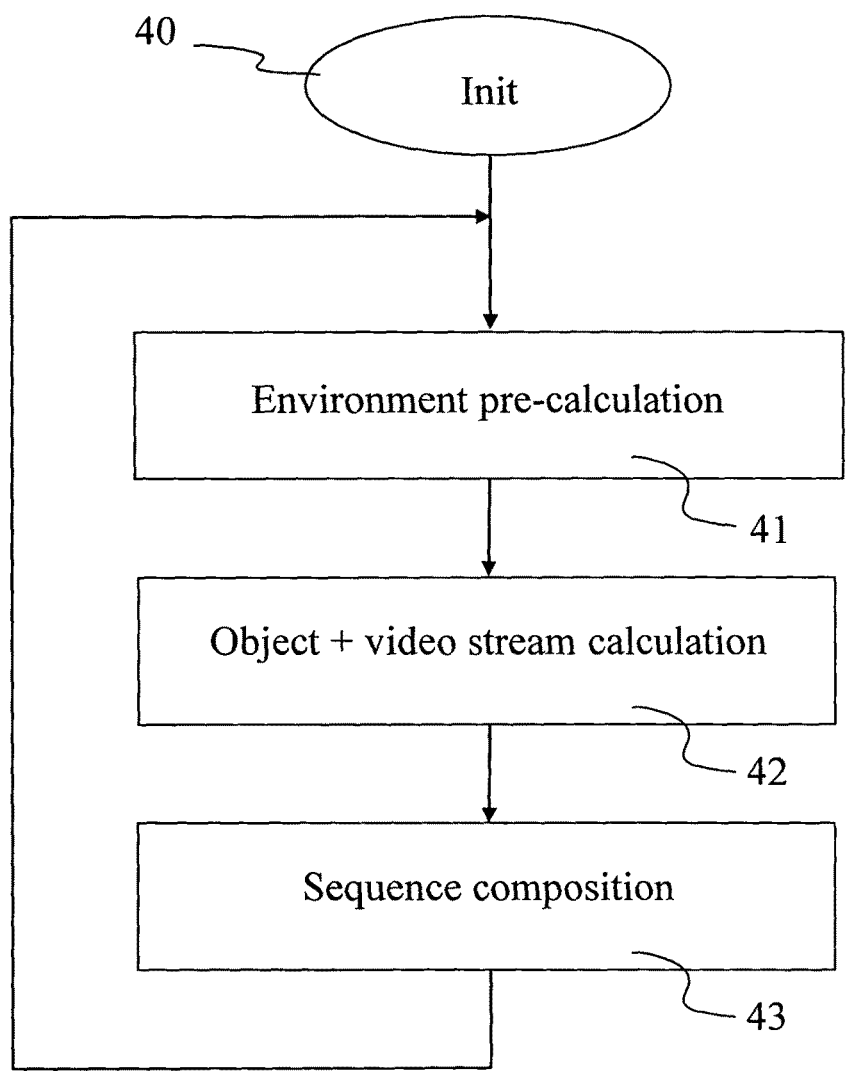
Figure 5:
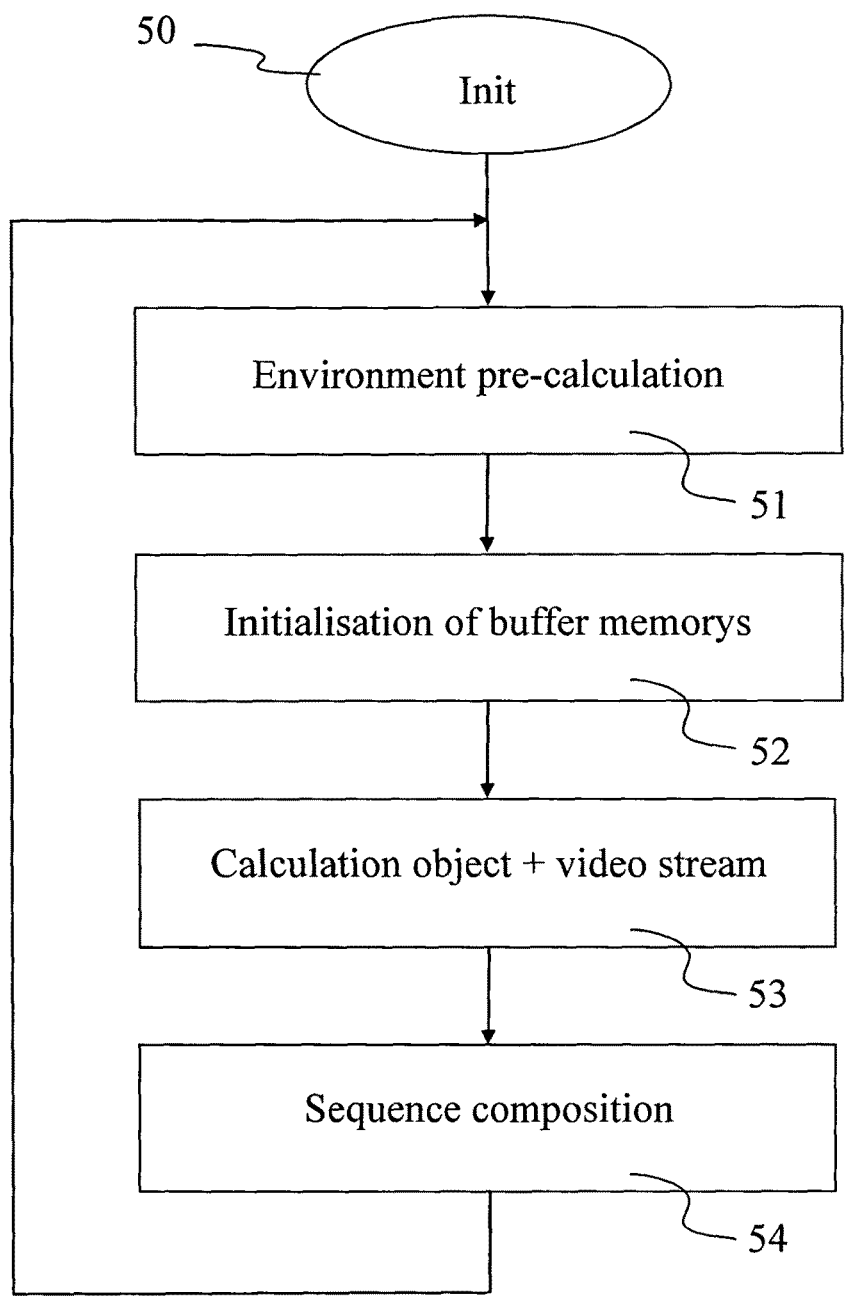

The invention will be better understood, and other specific features and advantages will emerge upon reading the following description, the description making reference to the annexed drawings wherein:

FIG. 1 shows a viewpoint of an environment 10, according to a particular embodiment of the invention, FIG. 2 diagrammatically shows the spatial positions of a camera realizing the viewpoint of the environment 10, according to a particular embodiment of the invention, FIG. 3 shows a system 3 for construction of a live video sequence integrating notably the environment 10, according to a particular embodiment of the invention, FIG. 4 shows a method for live construction of a video sequence according to a particular embodiment, implemented by the system 3, and FIG. 5 shows a method for live construction of a video sequence according to another particular embodiment, implemented by the system 3.

5. DETAILED DESCRIPTION OF EMBODIMENTS OF THE INVENTION

In a general but non-restrictive way, the invention relates to a method for live construction of a video sequence. The video sequence is composed live by combining of one or several images of an environment pre-rendered by image synthesis and one or several images of a 3D (for three dimensions) object for which the texture is formed by mapping of a live video stream. The combination of the environment and the modelled object on which is mapped a live video stream is advantageously carried out according to a first item of depth information associated with the environment and a second item of depth information associated with the modelled object.

FIG. 1 shows a video camera 1 in movement around an environment 10 composing for example a scene in which one or several mobile or non-mobile objects will later be inserted. Advantageously, the camera 1 is mobile around the environment and ensures the video capture of the environment via the taking of successive images. Each position of the camera 1 corresponds to a different viewpoint of the environment associated with the spatial position of the camera. According to a variant, several cameras in movement around the environment ensure the video capture of the environment 10. According to another variant, the captures of different viewpoints of the environment 10 are implemented by several fixed cameras. The environment 10 is advantageously composed of images captured by a camera 1 for which the position is fixed, the content of the environment varying for example in time. According to a variant, the environment 10 is composed of images captured by several fixed cameras.

According to a variant, the environment 10 is composed of images captured by a mobile camera 1, the content of the environment captured corresponding for example to the scanning of the mobile camera. The content of the environment advantageously also varies in time according to another variant.

FIG. 2 shows the four spatial positions P1, P2, P3 and P4 of the camera 1 shown in FIG. 1. At each spatial position, a frame of pre-rendering and an item of depth information, for example a depth key is associated, for each pixel of the frame. The scene in time can also be modified and thus at each time t1, t2 and t3 as shown in FIG. 2, a frame of different pre-rendering is obtained. Multiplying the number of frames of pre-rendering complicates the method but also enables more complex special effects. It is also possible to have a progression of frames of pre-rendering every two or three frames to represent slower movements. For example, there could be the ticking of a pendulum in the scene that oscillates at a speed less than the frame time and in this case, an image that does not change at every frame.

FIG. 3 diagrammatically shows a video sequence construction system 3 according to a particular embodiment of the invention. The system 3 comprises the following elements:
- a graphical 3D workstation 31,
- a video camera 32,
- an MMI ("Man Machine Interface") 33, and
- a 3D composer.

The workstation 31 ensures the graphical synthesis of the environment 10 captured by the virtual camera 1 by pre-calculation, as shown in FIG. 1, onto which it is possible to add for example 3D elements, to animate any element composing the environment (for example the light, the objects, the geometric surfaces, etc). At input to the workstation 31 there is the environment 10 as filmed by the virtual camera 1 and at output there are data representative of the image or images composing the environment 10 and an item of depth information associated with each image of the environment 10. The depth information corresponds for example to a depth key associated with each pixel of each image of the environment. The data representative of images of the environment 10 and the depth information associated are represented by the element 310 in FIG. 3. The workstation 31 also enables the modelling of one or several three dimensional objects 311, for example via any 3D modelling application installed on the workstation 31. The method used for the modelling of 3D objects is for example polygonal modelling, in which the model is assimilated with a set of polygons each defined by the list of summits and edges that compose it, NURBS (Non uniform rational basic spline) type curve modelling in which the model is defined by a set of curves created via control vertices, modelling by sub-division of surfaces or any other method known to those skilled in the art. According to a variant, the pre-calculation of the environment (that is to say the couple corresponding to the data representative of images and to the associated depth information) and the modelling of the 3D object are carried out on different workstations.

The data representative of synthesized images of the environment associated with the corresponding item or items of depth information on one hand and the data representative of modelled 3D objects on the other hand are transmitted to the 3D composer 34. The data representative of these images are advantageously stored in a buffer memory of the 3D composer and the associated items of depth information are also recorded in another buffer memory. According to a variant, the buffer memories used for the storage of data and depth information are initialized at each arrival of data representative of an image and the associated depth information. At the input of the 3D composer 34 data representative of a live video stream 320 also arrives, the images composing this video stream being captured live via a video camera 32. According to a variant, the data representative of the live video stream 320 are provided to the 3D composer 34 via a server on which are stored source images of a pre-recorded video. The video stream in this case is no longer captured live but is provided live to the 3D composer 34.

The 3D composer 34 advantageously comprises a 3D card comprising one or several GPUs (Graphics processing Unit) and ensures live the mapping of a current image of the video stream 320 on a corresponding image of the modelled object 311. The current image of the video stream thus mapped forms the texture of the modelled object. The 3D composer 34 calculates live the data representative of images of the modelled 3D object on which are mapped the current images corresponding to the video stream 320 as the pre-calculated images of the modelled object arrive and as the current images forming the live video stream 320 arrive at the input of the 3D composer 34. The modelled 3D object on which is applied a live video stream to form the structure of the modelled 3D object is called the textured 3D object hereafter in the description. In parallel with the calculation of data representative of images of the textured 3D object, the 3D composer calculates live an item of depth information associated with each calculated image of the textured 3D object, that is to say estimates an item of depth information for each pixel of the image representing the 3D modelled object having as texture an image of the live video stream 320.

The 3D composer 34 also ensures the live composition of a video sequence 340 at the output of the composer 34. The sequence 340 results from the combination of images of the textured 3D object having as texture the images of the live video stream 320 with the pre-calculated images of the environment 10. Advantageously, the 3D composer 34 ensures the management of occlusions by producing live occlusion tests for each pixel of each composed image. To do this, the 3D composer 34 uses items of depth information, for example depth keys, associated respectively with the images of the textured 3D object and with the images of the pre-calculated environment 10. The method employed to carry out the occlusion tests is for example the method known as the Z-buffer method. Thus, if a pixel of the composed image contains the projection of the modelled object and the projection of an object of the synthesized environment 10, the closest projection is retained, that is to say having the lowest depth value Z. The depth of a visible projection is stored in a depth buffer for each pixel, for example the depth value for each pixel of an image of the synthesized environment 10 is recorded in a depth buffer. During a movement of the textured 3D object, the movement being for example provoked by a user via the MMI interface 33, the depth value of a pixel composing the image of the textured 3D object is compared with the depth value of the pixel for which the spatial coordinates correspond to the spatial coordinates of the pixel of the 3D object considered, and likewise for each pixel of the textured 3D object. If the depth value of the pixel of the 3D object is less than the depth value of the pixel of the corresponding environment, it is the data (for example RGB (Red, Green, Blue) data) corresponding to the pixel of the textured 3D object (and stored in a buffer memory dedicated to the image data of the textured 3D object) that will be displayed at the output of the 3D composer 34, that is to say in the image of the composed sequence 340. If the depth value of the pixel of the 3D object is greater than the depth value of the pixel of the corresponding environment, it is the data (for example the RGB data) corresponding to the pixel of the image of the synthesized environment 10 (and stored in a buffer memory dedicated to the image data of the pre-calculated (or synthesized) environment) that will be displayed at the output of the 3D composer 34, that is to say in the image of the composed sequence 340.

Such a method presents the advantage of using all of the calculating power of the 3D composer 34 for the mapping of a live video stream onto a modelled 3D object and for the rendering of a video sequence composed of a textured 3D object and a synthesized environment, the environment and the modelled 3D object having been calculated beforehand.

According to a particularly advantageous variant, the data of a pre-calculated image of the environment transmitted to the 3D composer are recorded in a first buffer memory. The associated depth information, for example the depth keys associated with each of the pixels of the pre-calculated image, are recorded in a second buffer memory. When the image data of the textured 3D object and the depth information, that is to say the depth keys associated with each of the pixels of the image of the textured 3D object, have been calculated, each depth key of the textured 3D object is compared with the corresponding key of the pre-calculated image stored in the buffer memory. If the value of the depth key of the textured 3D object is less than the value of the depth key of the pre-calculated image, the data of the pixel of the textured 3D object associated with the depth key overwrite the data of the pixel corresponding to the pre-calculated image in the first buffer memory and it is the data of this pixel of the textured 3D object that are displayed in the resulting image of the composition, based on the content of this first buffer memory. Conversely, if the value of the depth key of the textured 3D object is greater than the value of the depth key of the pre-calculated image, the data of the pixel of the textured 3D object associated with the depth key do not overwrite the data of the pixel corresponding to the pre-calculated image in the first buffer memory and it is the data of the pixel of the pre-calculated image that are displayed in the resulting image of the composition, based on the content of this first buffer memory. The method thus described applies for each pixel of each image of the textured 3D image.

According to another variant, the first and second buffer memories are initialised by respectively the data of each new pre-calculated image of the environment and the associated depth information entering the 3D composer. Thus, once an image of the video sequence 340 (from the combination of a pre-calculated image and an image of the textured 3D object) has been composed and output from the 3D composer 34, the buffer memories are automatically initialised with data that will serve as a basis for the composition of a new image of the video sequence 340.

FIG. 4 shows a method for construction of a live video sequence implemented in a system 3, according to a non-restrictive particularly advantageous embodiment of the invention.

During an initialisation step 40, the different parameters of elements composing the system 3 (particularly the workstation 31 and the 3D composer 34) are updated.

Next, during a step 41, the data representative of a first image of a 3D environment 10 are pre-calculated as well as a first item of depth information associated with the first pre-calculated image. Advantageously, the pre-calculation is carried out for several images representative of the environment, for example for a video environment comprising several temporally succeeding images or for each image of a different viewpoint of the environment, that is to say for each image of the environment captured according to a different viewing angle. In the case where several images are pre-calculated, an item of depth information is also pre-calculated for each image of the environment and associated with this latter.

Then during a step 42, the data representative of a second image representing a modelled 3D object for which the texture is formed from a current image of a live video stream are calculated live. Advantageously, the modelled 3D object is modelled by pre-calculation according to any method known to those skilled in the art, before a current image of a video stream is applied to it by mapping to form its texture. A second item of depth information associated with the second image is also calculated live. Advantageously, the live video stream mapped on the modelled 3D object to form the structure of the modelled 3D object is formed of several images. The data representative of each image of the textured 3D object are thus calculated live, for each image of the textured 3D object as well as the item of depth information associated with each of these images.

Finally, during a step 43, a video sequence is composed by combination of the first pre-calculated image or images of the environment with the second image or images of the textured 3D object. The combination of each of the first and second images is implemented according to each first item of depth information associated with each first image and each second item of depth information associated with each second image, for example by comparison of first and second items of depth information, the image or the part of the image for which the depth information associated with the lowest value is displayed in the composed image.

FIG. 5 shows a method for construction of a live video sequence implemented in a system 3, according to another non-restrictive particularly advantageous embodiment of the invention.

During an initialisation step 50, the different parameters of elements composing the system 3 (particularly the workstation 31 and the 3D composer 34) are updated.

Next, during a step 51, the data representative of one or several first images of a 3D environment are pre-calculated as well as the first item or items of associated depth information. Step 51 is similar to step 41 described in reference to FIG. 4 and it is not described again in this paragraph.

Then, during a step 52, a G-RAM (Graphics Random Access Memory), RAM (Random Access Memory) or flash type memory buffer for example serving for storage of data representative of a second image of the textured 3D object calculated live is initialised with the data representative of a first image of the pre-calculated environment. In the same way, a G-RAM, RAM or flash memory buffer for example serving for the storage of the second item of depth information associated with a second image of the textured 3D object calculated live is initialised with the first item of depth information associated with a first image of the pre-calculated environment.

Then, during a step 53, the image or the images of a live video stream are mapped on the corresponding image or images of a modelled 3D object to form the texture of the modelled 3D object. The modelled 3D object having as texture the images of the live video stream is hereafter called the textured 3D object. As described in step 42 in reference to FIG. 4, the data representative of the second image or images representing the textured 3D object are calculated live as are the second item or items of associated depth information.

Finally, during a step 54, a video sequence is composed by combination of the second image or images of the textured 3D object with the first corresponding pre-calculated image or images of the environment according to the first and second associated items of depth information. The second item of depth information calculated live is compared with the first item of depth information stored in the buffer memory intended initially for the storage of the second item of depth information. If the second item of depth information has a value less than that of the first item of depth information, then the data representative of the second image are stored in the buffer memory initialised with the data representative of the first image and overwrite the data representative of the first image. This results in the display of data representative of the second image in the composed image resulting from the combination of first and second images. Conversely, if the second item of depth information has a value greater than that of the first item of depth information, then the data representative of the second image do not overwrite the data representative of the first image that are stored in the buffer memory initialised with the data representative of the first image. This results in the display of data representative of the first image in the composed image resulting from the combination of first and second images. Advantageously, the items of depth information correspond to a set of depth keys, a depth key being associated with each pixel of an image. According to a variant, at least one occlusion test is carried out for each pixel of each image of the video sequence resulting from the combination of a first image and a second image. The occlusion test is advantageously carried out according to the Z-buffer method by comparison of each depth key associated with a pixel of a second image of a textured 3D object at each depth key associated with a pixel of a first image of the pre-calculated environment, the compared pixels having the same spatial coordinates. The pixel for which the depth key has the lowest value is displayed in the composed image.

Advantageously, steps 51, 52, 53 and 54 are repeated for each first image of the pre-calculated environment and for each image of the textured 3D object calculated live. The buffer memory intended for storage of data of second images is initialised with the data of a new first image following the composition of an image of the video sequence produced by the combination of a first image preceding the new first image to be stored in the buffer memory and a temporally corresponding second image. In the same way, the buffer memory intended for storage of depth information associated with the second images is initialised with the depth information associated with a new first image following the composition of an image of the video sequence produced by the combination of a first image preceding the new first image to be stored in the buffer memory and a temporally corresponding second image.

Naturally, the invention is not limited to the embodiments previously described.

In particular, the invention is not restricted to a method for live construction of a video sequence but extends to the system implementing such a method, and particularly to the 3D composer implementing such a method.

Advantageously, the video sequence comprises several objects modelled in three dimensions, each object having a specific mobility with respect to the other modelled 3D objects. According to a variant, several live video streams are mapped onto the plurality of modelled 3D objects to form a plurality of textured 3D objects, to each modelled 3D object being mapped a different live video stream, each textured 3D object thus possessing a specific texture. According to another variant, a same video stream is applied to several modelled 3D objects, these latter thus possessing a same texture.

The invention claimed is:

1. A method for live construction of a video sequence, said sequence comprising an object modelled in three dimensions, wherein the method comprises:
    pre-calculating data representative of at least one first image of a three-dimensional environment and a first item of depth information associated with said image,
    live calculation of:
        data representative of at least one second image representing said modelled object on which is mapped a current image of a live video stream, said current image forming the texture of the modelled object, the mapping of the current image on said modeled object using only texture data of the current image, and
        a second item of depth information associated with said at least one second image, and
    live composition of said sequence by combining said at least one first image and at least one second image according to said first and second items of depth information.

2. The method according to claim 1, further comprising:
    initializing a destination buffer of said at least one second image with the data representative of said at least one first image, and
    initializing a destination buffer of said second item of depth information with said first item of depth information.

3. The method according to claim 1, wherein at least one occlusion test is carried out for each pixel of said sequence during said composition.

4. The method according to claim 1, wherein said environment is a video pre-calculated with a fixed camera.

5. The method according to claim 1, wherein said environment is a video pre-calculated with a mobile camera.

6. A device configured for live construction of a video sequence, said sequence comprising an object modelled in three dimensions, wherein the device comprises at least one processor configured for:
    pre-calculating data representative of at least one first image of a three-dimensional environment and a first item of depth information associated with said image,
    live calculation of:
        data representative of at least one second image representing said modelled object on which is mapped a current image of a live video stream, said current image forming the texture of the modelled object, the mapping of the current image on said modelled object using only texture data of the current image, and
        a second item of depth information associated with said at least one second image, and
    live composition of said sequence by combining said at least one first image and at least one second image according to said first and second items of depth information.

7. The device according to claim 6, wherein the at least one processor is further configured for:
    initializing a destination buffer of said at least one second image with the data representative of said at least one first image, and
    initializing a destination buffer of said second item of depth information with said first item of depth information.

8. The device according to claim 6, wherein the at least one processor is further configured for carrying out at least one occlusion test for each pixel of said sequence during the live composition.

9. The device according to claim 6, wherein said environment is a video pre-calculated with a fixed camera.

10. The device according to claim 6, wherein said environment is a video pre-calculated with a mobile camera.

* * * * *